United States Patent Office 2,780,647
Patented Feb. 5, 1957

2,780,647

PROCESS FOR PREPARING HYDROXY DIPHENYLAMINES

Louis Spiegler, Woodbury, N. J., assignor to E. I. du Pont de Nemours and Company, Wilmington, Del., a corporation of Delaware No Drawing. Application July 20, 1953, Serial No. 369,249

7 Claims. (Cl. 260—571)

This invention relates to an improved process for the production of hydroxy diphenylamines, and more particularly to compounds having the formula:

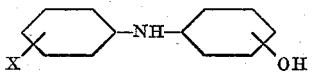

where X is hydrogen, alkyl, or alkoxy.

Compounds of the type to which the present invention relates are useful as intermediates for many dyestuffs, and also as intermediates for rubber antioxidants. Heretofore, many processes have been proposed for their preparation, but they all have serious technical disadvantages such as expensive starting materials, the formation of relatively large amounts of undesirable by-products and the consequent necessity of purification of the final product. Other processes have inherent disadvantages such as using high super-atmospheric pressures, strong acids and giving poor yields.

It is an object of this invention to provide a relatively simple process for producing hydroxy diphenylamines in good yields. Another object of the invention is to provide a process which eliminates super-atmospheric pressures and strong acids. A still further object is the provision of a process which inherently produces a high yield with a minimum of side reactions and by-products. Other objects will appear as the description of the invention proceeds.

These and other objects are accomplished by preparing hydroxy diphenylamines having the structure:

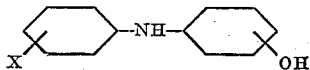

where X is hydrogen, lower alkyl, or lower alkoxy by the catalytic hydrogenation of a mixture of a phenol and a mononitrobenzene at a temperature of about 25° to 50° C. at atmospheric pressure in the presence of 1% to 10% sulfuric acid and from 0.05% to 0.10% of a water-soluble quaternary ammonium compound based on the weight of the dilute acid solution.

The mononitrobenzene used as one of the starting materials is one having the following formula:

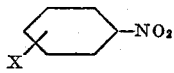

where X is hydrogen, lower alkyl, or lower alkoxy groups having from 1 to 4 carbon atoms. Examples of mononitrobenzenes falling within this class may be mentioned nitrobenzene, o, m, and p-nitrotoluene, o, m, and p-nitroanisole, the mononitroxylenes, mononitromethoxybenzene, mononitroethoxybenzene, mononitropropyloxybenzene, and the corresponding alkoxy toluenes, xylenes and mesitylenes.

The phenols used as a starting material in the process include not only phenol itself but the mono-, di,- and polyhydroxy phenols such as catechol, hydroquinone, resorcinol, phloroglucinol, pyrogallol, hydroxy hydroquinone and the like. The term also includes mono-lower alkyl ethers of the dihydroxy benzenes and mono- and di-lower alkyl ethers of trihydroxy benzenes. It is essential, however, that the phenol contain a free phenolic group, since anisole itself is inoperative.

The water-soluble quaternary ammonium compound must be present, otherwise the reduction does not proceed satisfactorily and poor yields are obtained. While no theory is advanced as to the exact function of the quaternary ammonium compounds, it has been observed that poisoning of the catalyst is inhibited when a quaternary compound is present. It has also been noted that its function is not merely that of a dispersing action, since improvement is obtained with quaternary ammonium compounds which are not dispersing agents and, conversely, the effect is not obtained with known dispersing agents which are not quaternary ammonium compounds. The compounds should be water-soluble and also stable in the presence of the dilute sulfuric acid used in the process. A quaternary ammonium compound which has been found particularly effective is tallow trimethyl ammonium chloride:

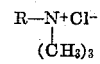

where R is mainly a $C_{16}$ and $C_{18}$ alkyl group, although the invention is not limited to this compound since a large variety of quaternary ammonium compounds are operative. These may be either of the kind which is ionizable to two separate ions (a substituted ammonium cation and an anion such as a halide ion) or an inner salt such as a betaine. The compound preferably contains at least one alkyl group containing at least 10 and no more than 18 carbon atoms, although compounds such as tetramethyl ammonium chloride are also effective. Betaines having a normal alkyl radical of 14 to 16 carbon atoms substituted on the methylene carbon comprises another preferred group of compounds of this class. Representative quaternary ammonium compounds useful in the process of this invention include octadecyl trimethyl ammonium chloride, octadecyl dimethyl ammonium bromide, dioctadecyl dimethyl ammonium chloride, dipentadecyl dimethyl ammonium chloride, dodecyl trimethyl ammonium chloride, C-cetyl betaine, C-dodecyl betaine, and tetramethyl ammonium chloride. At least about 0.05% based on the weight of dilute acid suspension of the quaternary ammonium compound should be employed. Ordinarily no further advantage is obtained by using more than 0.1%.

The hydrogenation catalyst is preferably platinum or palladium or their oxides supported on charcoal or other porous material such as kieselguhr and the like. The hydrogenation catalyst should be acid insensitive, that is, it should not be rendered ineffective by the presence of the sulfuric acid. The concentration of catalyst in the reaction mixture will depend on the other operating conditions and on the result desired. The rate of hydrogenation increases with increased catalyst concentration, but this also increases the undesired side reactions. When the catalyst consists of 1% platinum supported on charcoal its amount (including the support) is preferably from 1.0% to 3% of the weight of the dilute acid solution. Platinum is the preferred catalyst, but palladium can also be used as is shown in Example V.

The operable temperature range is from 25° to 50° C. Example II shows that increased temperatures produce lower yields and cause the formation of greater amounts of undesired by-products. For example, when the reaction is carried out at 30° C. a 73% yield is obtained, but at 50° C. the yield drops to about 66%. At temperatures below 25° C. the reaction is too slow for commercial production, and therefore the preferred temperature range is from 25° to 35° C.

The invention is carried out at atmospheric pressure which simplifies the process and represents an advantage over the prior art. It will be apparent that the partial pressure of hydrogen is below that of atmospheric as shown in Example I where the partial pressure is held at about 725 mm. of mercury.

The reaction is carried out in the presence of dilute sulfuric acid. Examples III and IV show that increased dilution of sulfuric acid strength is favorable to a higher yield. In general, higher dilution favors a greater yield of the desired product, and a lower yield of undesirable products. It is preferred to carry out the reaction in an aqueous solution having a sulfuric acid strength of from 1% to 10% by weight.

The following examples are given by way of illustration, but the invention is not limited to the specific details of the examples, since the concentration of acid, temperatures, proportions, and type of nitro and phenol compounds may be varied, provided they fall within the limitations discussed above.

EXAMPLE I

*Hydrogenation of p-nitroanisole in the presence of phenol with 10% sulfuric acid using platinum catalyst*

The equipment employed for the reductive condensation reaction is a 5 liter creased flask having four vertical creases which serve as baffles. This flask is fitted with a sealed-in glass stirrer consisting of a 5.5 inch flat blade 1.5 inches high, with a circular lower edge which is operated at 700–800 R. P. M. The flask is also provided with a manometer for reading pressure, a heating and cooling jacket, an inlet and outlet for hydrogen gas, and an inlet with a calibrated buret for control addition of nitro compound or phenolic solution of the latter. The flask is charged with 1000 parts by weight of water, 120 parts of 96% sulfuric acid, 0.6 part of octadecyl trimethyl ammonium chloride ("Arquad" T), and 0.0264 part of platinum supported on 2.64 parts of charcoal. The flask and its contents are first flushed with nitrogen to remove air, then with hydrogen to displace nitrogen. The agitation is started and a solution (77 ml.) of 44 parts p-nitroanisole (0.288 mol) and 44 parts of phenol (0.467 mol) is added over a 12 to 13 hour period (6.0–6.5 ml. per hour). Hydrogen is added simultaneously at such a rate that the pressure in the flask remains essentially constant. The temperature is maintained at 25° to 32° C. and the total pressure at 760 mm. of mercury (±5 mm.); the partial pressure of hydrogen being approximately 725 mm. Hydrogen is absorbed at a rate of 0.07 to 0.04 cu. ft. per hour.

At the end of the reaction time the solution (1240 ml.) contains 45 parts (0.21 mol) of p-(p-methoxy anilino) phenol which is a 73% yield based on the nitro body. Also present are 24.5 parts (0.26 mol) of unreacted phenol, 4.05 parts (0.03 mol, 10.4% yield) of p-anisidine and 3.28 parts (0.03 mol, 10.4% yield) of p-aminophenol.

The unreacted phenol is recovered by steam distillation at constant volume. After separation of the catalyst by hot filtration the clarified liquors are cooled and the acidity of the solution is adjusted by adding ammonia or caustic soda solution to a pH of 2.5 to 3.0. Practically colorless p-(p-methoxy anilino) phenol is thus precipitated. The product is then filtered off under nitrogen pressure and dried at 50° C. in a current of dry nitrogen. The p-(p-methoxy anilino)phenol melted at 108.5° to 108.8° C. (literature 106° to 109° C.). A mixed melting point with an authentic sample of purified p-(p-methoxy anilino)phenol which melted at 107° to 107.5° C. did not show any depression in melting point. The analysis of the p-(p-methoxy anilino)phenol follows:

Found/Calc.: N, 6.5, 6.5/6.5
  C, 72.5, 72.2/72.6
  H, 6.67, 6.84/6.05

If 4,4′-dimethoxy diphenylamine is the desired end product, it is possible to methylate the total reduction liquors with caustic soda and dimethyl sulfate (or methyl acid sulfate) and separate the water-insoluble methylation products by fractional distillation.

EXAMPLE II

*Effect of temperature*

Hydrogenation at temperatures greater than 30° C. results in greater hydrogen consumption, a faster rate of reduction, with a decrease in yield of p-(p-methoxy anilino)phenol, and the formation of more p-aminophenol.

Thus, when the hydrogenation is carried out in 10% sulfuric acid as described in Example I but using 49.5 parts of p-nitroanisole (0.323 mol) and 49.5 parts of phenol (0.524 mol) at 50° to 52° C. with 0.023 part platinum supported on 2.3 parts of charcoal, the reaction requires 9.75 hours and hydrogen is absorbed at a rate of 0.03 cu. ft. per hour. The solution thus obtained (1211 ml.) contains 0.315 mol of unreacted phenol, 0.212 mol of p-(p-methoxy anilino)phenol (66% yield), 0.0396 mol of p-anisidine (12.3% yield), and 0.070 mol of p-aminophenol (21.7% yield).

EXAMPLE III

*The effect of sulfuric acid strength on yield*

When the hydrogenation is carried out at 30° C. as described in Example I, it has been found that greater yields are obtained as the sulfuric acid strength decreases. In addition to the increased yield of p-(p-methoxy anilino)phenol the amount of p-aminophenol and p-anisidine is decreased. This information is readily observed in the following table:

| $H_2SO_4$ Conc., Percent | Pt. Cat. Parts/Wt. | Mols Reduced | | Red. Time, hr. | p-(p-Methoxy anilino) phenol | p-amino- phenol | p-anisi- dine |
|---|---|---|---|---|---|---|---|
| | | PNA | Phenol | | | | |
| 5.1 | 0.0297 | 0.281 | 0.457 | 10.2 | 78.8 | 8.7 | 8.3 |
| 2.5 | 0.0264 | 0.281 | 0.457 | 9.3 | 82.0 | 4.0 | 10.9 |

EXAMPLE IV

*Reaction of p-nitroanisole and anisole*

Using the technique described in Example I and adding over a period of 5.6 hours a solution of 49.2 parts of p-nitroanisole (0.322 mol) and 34.7 parts of anisole (0.322 mol) to a well agitated slurry of 0.02 part platinum supported on 2 parts charcoal which is suspended in 1000 parts water containing 59 parts of 96% sulfuric acid, and 0.9 part of octadecyl trimethyl ammonium chloride, reaction with hydrogen at 25° to 32° C. occurs at a rate of 0.157 cu. ft. per hour. The resulting solution (1120 ml.) is found to contain 0.32 mol of anisole, 0.032 mol of p-anisidine (10% yield) and 0.29 mol of p-aminophenol (90% yield).

The anisole is not reacted and can be recovered by distillation with steam.

EXAMPLE V

*Hydrogenation with palladium catalyst*

The catalytic hydrogenation of the p-nitroanisolephenol mixture at 30° to 31° C. in the manner given in Example I but using 0.05 part of palladium supported on 1.67 part of charcoal yields a reduction liquor which contains 53% p-(p-methoxy anilino)phenol, 20% of p-aminophenol, and 27% of p-anisidine.

EXAMPLE VI

*Hydrogenation of nitrobenzene in presence of phenol*

34.5 parts (0.28 mol) of thiophene free nitrobenzene is dissolved in 43.5 parts (0.458 mol) of phenol. This mixture is reduced over a period of 12.3 hours as in Example I by being added gradually and simultaneously with 0.692 cu. ft. of hydrogen to a 28° to 30° C. suspension of 0.02 part of platinum (on 2 parts of charcoal support) and 1070 parts of 10% sulfuric acid containing 0.6 part of the surface-active agent. After the reaction is completed and the solution filtered, the solution is found to contain 27.7 parts (0.295 mol) of phenol, 30.1 parts (0.163 mol) p-anilinophenol (58.2% yield), 6.9 parts (0.074 mol) aniline (26.4% yield) and 3.6 parts (0.033 mol) p-aminophenol (11.8% yield).

These products are separated as described in Example I. The p-anilinophenol, isolated by precipitation from its sulfate solution at a pH of 2.5 to 3.0 is a buff to cream colored solid which melts at about 50° C. and when moist darkens rapidly on exposure to air. It is soluble in dilute caustic soda and its alkaline solution turns red in color and develops an iso-nitrile odor when shaken with air or oxygen. The p-anilinophenol can be purified by distillation under reduced pressure (boiling point 215° to 216° C. over 12 mm., melting point 70° C.).

In the absence of phenol, the products obtained from nitrobenzene by catalytic reduction in sulfuric acid are principally aniline and p-aminophenol.

EXAMPLE VII

*Hydrogenation p-nitrotoluene in the presence of phenol in 10% sulfuric acid using platinum catalyst*

37.2 parts (0.272 mol) of p-nitrotoluene is dissolved in 41.4 parts (0.441 mol) of phenol. This mixture is reduced as described in Example VI. 2.46 cu. ft. of hydrogen per mol of p-nitrotoluene is absorbed at the rate of 0.06 cu. ft. per hour.

The resulting solution contains 25.5 parts (0.272 mol) of unreacted phenol, 6.86 parts (0.064 mol) of p-toluidine, 4.65 parts (0.038 mol) of aminocresol, and 33.8 parts (0.17 mol) of p-(p-toluidino)phenol which represents 62.4% yield. The p-(p-toluidino)phenol is isolated as described in the previous examples. It precipitates at a pH of 2.5 as a practically colorless product melting at 110° to 115° C. When moist it discolors rapidly on exposure to air. The compound displays all the characteristics expected of a hydroxy diphenylamine; that is, alkali solubility, ease of oxidation with air, and blue color reaction with concentrated sulfuric acid containing a trace of nitrite. The product can be purified by distillation (B. P. 350° C. to 360° C., M. P. 122° C.).

The present invention represents a distinct advance over the prior art for the preparation of hydroxy and alkoxy diphenylamines in that the process is economical, avoids super-atmospheric pressures, concentrated acids and eliminates, to a large extent, undesirable side reactions.

It will be apparent that many widely different embodiments of this invention may be made without departing from the spirit and scope thereof, and therefore it is not intended to be limited except as indicated in the appended claims.

I claim:

1. The process of preparing hydroxy diphenylamines which comprises reacting a mixture of a phenol, a mononitrobenzene and hydrogen in contact with a catalyst mass under atmospheric pressure at a temperature of about 25° to 35° C., said catalyst mass comprising an aqueous dispersion of a finely-divided hydrogenation catalyst selected from the group consisting of platinum, palladium and their oxides, from 1% to 10% by weight of sulfuric acid, from 0.05% to about 0.1%, based on the weight of said dilute acid solution, of a water-soluble quaternary ammonium compound which is stable in dilute sulfuric acid, said quaternary ammonium compound being taken from the group consisting of tetraalkyl ammonium chlorides and bromides containing at least one and not more than two alkyl groups of at least 10 carbon atoms and not more than 18 carbon atoms, and, C-n-alkyl-betaines containing an alkyl group of from 12 to 16 atoms, the said phenol being selected from the class consisting of mono-, di-, and tri-hydric phenols, the mono-, lower alkyl ethers of the di-hydric phenols and the mono-, and di-alkyl ethers of the tri-hydric phenols, said alkyl groups having from 1 to 4 carbon atoms, and the said mononitrobenzene having the formula:

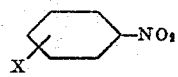

where X is selected from the class consisting of hydrogen, lower alkyl and lower alkoxy groups, the said lower alkyl and lower alkoxy groups having from 1 to 4 carbon atoms.

2. The process of claim 1 in which the quaternary ammonium compound has the formula:

where R is an alkyl group having from 10 to 18 carbon atoms.

3. The process of claim 2 in which R is predominately a mixture of 16 and 18 carbon atom alkyl groups.

4. The process of claim 1 in which the catalyst including a support is present in the amount of 0.1% to 3% of the weight of the acid solution.

5. The process of preparing p-(p-methoxyanilino) phenol, which comprises reacting a mixture of phenol, p-nitroanisole and hydrogen in contact with a catalyst mass under atmospheric pressure at a temperature of about 25 to 35° C., said catalyst mass comprising an aqueous dispersion of a finely divided hydrogenation catalyst selected from the group consisting of platinum, palladium and their oxides, from 1 to 10% by weight of sulfuric acid, from 0.05% to about 0.1%, based on the weight of said dilute acid solution, of a water-soluble quaternary ammonium compound which is stable in dilute sulfuric acid, said quaternary ammonium compound being taken from the group consisting of tetraalkyl ammonium chlorides and bromides containing at least one and not more than two alkyl groups of at least 10 carbon atoms and not more than 18 carbon atoms, and C-n-alkyl-betaines containing an alkyl group of from 12 to 16 carbon atoms.

6. The process of claim 5 in which the quaternary ammonium compound is octadecyl trimethyl ammonium chloride.

7. The process in claim 5 in which the catalyst including a support is present in the amount of 0.1 to 3% of the weight of the acid solution.

References Cited in the file of this patent

UNITED STATES PATENTS

| 2,041,782 | Semon | May 26, 1936 |
| 2,666,791 | Weinmayer | Jan. 19, 1954 |